United States Patent [19]

Suzuki

[11] Patent Number: 4,961,126
[45] Date of Patent: Oct. 2, 1990

[54] STRUCTURE OF A DEVICE CASING

[75] Inventor: Hiroyuki Suzuki, Tokyo, Japan

[73] Assignee: Casio Computer Co., Ltd., Tokyo, Japan

[21] Appl. No.: 375,337

[22] Filed: Jun. 30, 1989

[30] Foreign Application Priority Data

Jul. 4, 1988 [JP] Japan .............................. 63-88876[U]
Apr. 11, 1989 [JP] Japan ..................................... 1-89813
Apr. 14, 1989 [JP] Japan ............................... 1-43046[U]

[51] Int. Cl.$^5$ ............................................. H05K 1/00
[52] U.S. Cl. ................................ 361/398; 235/145 R; 361/380; 361/394; 361/413; 361/395; 439/31; 439/164; 439/165
[58] Field of Search ..................... 235/145 R; 340/712, 340/714, 734; 361/380, 394, 395, 398, 399, 413; 439/31, 164, 165; 364/708

[56] References Cited

U.S. PATENT DOCUMENTS

| | | | |
|---|---|---|---|
| 4,589,659 | 5/1986 | Yokoi et al. ......................... | 364/708 |
| 4,623,992 | 11/1986 | Kurosaki et al. .................... | 361/331 |
| 4,625,259 | 11/1986 | Krechmer et al. ................... | 361/395 |
| 4,703,160 | 11/1987 | Narishima et al. ................... | 364/708 |

FOREIGN PATENT DOCUMENTS 56-37137 4/1981 Japan .

*Primary Examiner*—Gregory D. Thompson
*Attorney, Agent, or Firm*—Frishauf, Holtz, Goodman & Woodward

[57] ABSTRACT

A device casing, wherein a first casing component for containing a display panel and a second casing component for containing a keyboard can be openably/closably connected. The first and second casing components have hinge storing sections at their mutually facing sides. A hinge member has a groove for insertion of a flexible connection member for electrically connecting the display panel and the keyboard. The hinge member and the first casing component are coupled such that the first casing component is rotatable about a first support shaft provided on the hinge member. The hinge member and the second casing component are coupled such that the second casing component is rotatable about a second support shaft provided on the hinge member. Since both casing components are rotated relative to the hinge member about the different support shafts, the angle of bending of the connection member, which is bent in accordance with the opening/closing of the device casing, can be reduced to half, and the durability of the connection member can be enhanced. Furthermore, since the connection member is not exposed to the outside, the reliability of the device casing can be increased, and the external appearance of the device casing is very pleasing.

11 Claims, 14 Drawing Sheets

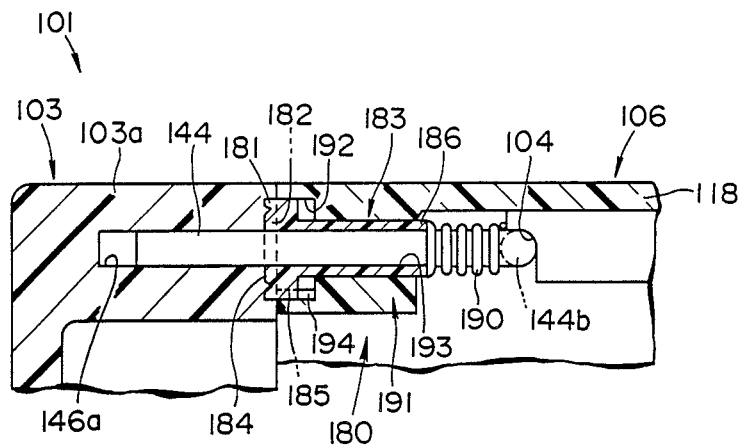
FIG.11
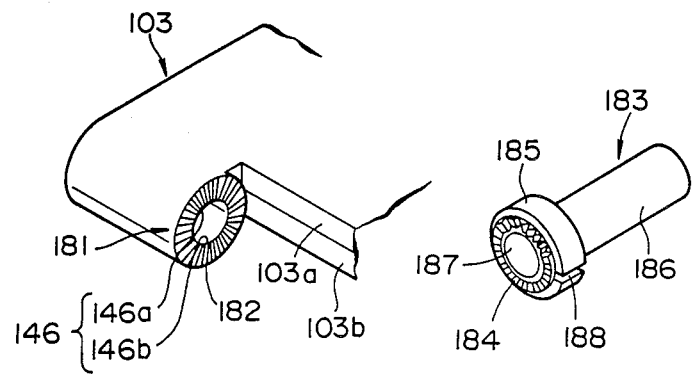
FIG.12A FIG.12B

STRUCTURE OF A DEVICE CASING

BACKGROUND OF THE INVENTION

1. Field of the Invention

The present invention relates to a structure of a device casing wherein a pair of casing components are foldably arranged such that electronic parts stored in the casing components are electrically connected by a flexible connection member.

2. Description of the Related Art

A foldable small-sized electronic device such as a portable electronic calculator is known. In such an electronic device, a device casing made of synthetic resin comprises a pair of casing components coupled by a hinge. For example, in the case of an electronic calculator, various electronic parts such as a keyboard, a circuit board, a liquid crystal display panel, etc., are separately stored in the casing components. The electronic parts stored in the casing components are electrically connected with one another by a flexible connection member.

A conventional coupling structure used in the above foldable electronic device is constituted by cylindrical hinge components provided at both ends of each of facing side portions of the casing components, and hinge pins rotatably inserted into shaft holes of the cylindrical hinge component. In this case, each casing components is rotatable about the hinge pins inserted into the hinge components provided at both ends of each casing component. When the casing components are opened, the device is set in the state for use. On the other hand, when the casing components are closed, the device is set in the non-use state.

In the conventional device casing using the above-mentioned hinge, however, the connection member is exposed to the outside, both in the case where the casing components are opened for use and in the case where the casing components are closed for non-use. Thus, the external appearance of the device is not good. In addition, the connection member easily suffers external damage, and may be broken.

The connection member is bent in accordance with the angle of rotation of the casing components. In the conventional structure, the angle of bending of the connection member is nearly equal to the angle of rotation of the casing components. If the casing components are rotated by 180°, the connection member is also rotated about 180°. Thus, the angle of bending of the connection member is considerably large, resulting in the problem that the fatigue of the connection member due to repeated bending caused by the opening/closing of the casing components is large, and the durability of the connection member is low.

SUMMARY OF THE INVENTION

The object of the present invention is to provide a structure of a device casing ensuring highly reliable and durable connection between casing components and having a good external appearance.

In order to achieve the above object, the structure of the device casing according to the present invention includes a first casing part for carrying a given electronic part, the first casing part having a hinge storing section at one end portion. A second casing part is provided for carrying a given electronic part, the second casing part having a hinge storing section at one end portion facing the first casing part. A flexible connection member connects the electronic part in the first casing part and the electronic part in the second casing part. A hinge member comprised of a pair of hinge portions, at least one of which has a groove for inserting the flexible connection member, is arranged within the hinge storing sections of the first and second casing parts, for connecting the first casing part and the second casing part for rotation relative to one another. A first support shaft, arranged in the hinge storing section of the first casing part, rotatably connects the first casing part and the hinge member, and a second support shaft, arranged in the hinge storing section of the second casing part, rotatably connects the second casing part and the hinge member. Further, the second casing part includes an upper casing portion and a lower casing portion, and a keyboard is contained between the upper and lower casing portions.

BRIEF DESCRIPTION OF THE DRAWINGS

FIG. 11 is an enlarged sectional view of a connection section of a device casing according to a fourth embodiment of the present invention, which is taken along the axis of the connection section, this casing being provided with an inclination retaining mechanism;

FIG. 12A is a perspective view of the casing component shown in FIG. 11;

FIG. 12B is a perspective view of a ratchet included in the inclination retaining mechanism shown in FIG. 11;

DETAILED DESCRIPTION OF THE PREFERRED EMBODIMENTS

The present invention will now be described in detail with reference to the accompanying drawings.

<First Embodiment>

Figure 1:
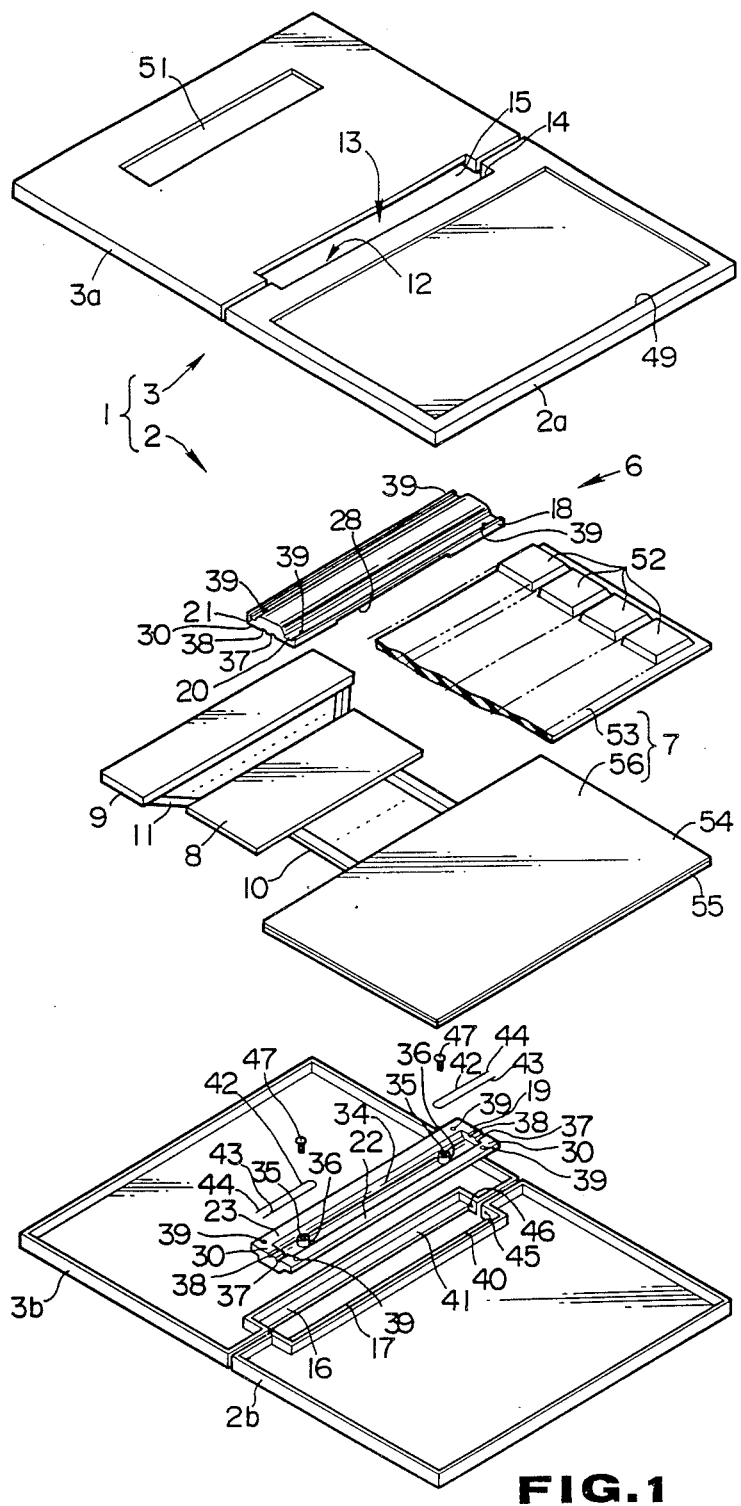
FIG. 1 is an exploded perspective view showing an entire structure of a portable electronic calculator having a pair of device casing components foldably coupled to each other according to a first embodiment of the present invention.
Figure 2:
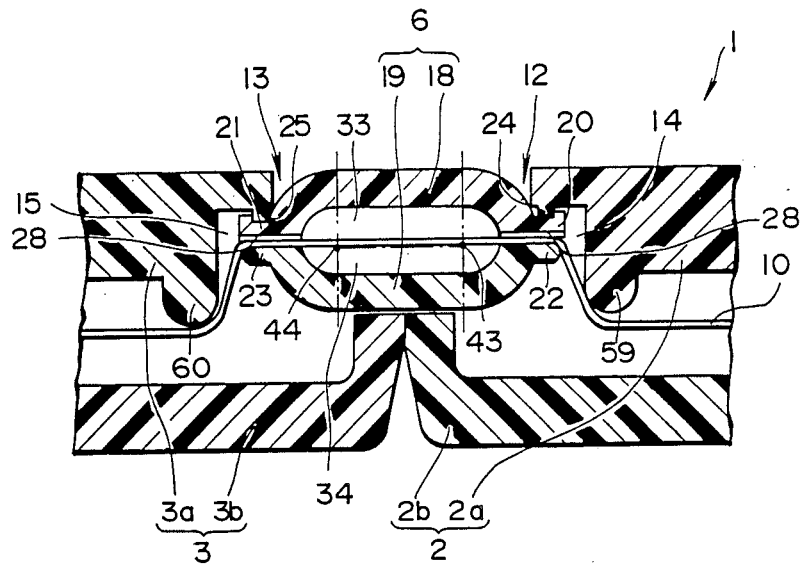
FIG. 2 is an enlarged sectional view of a connection section when the casing components shown in FIG. 1 are opened to a maximum degree.
Figure 3:
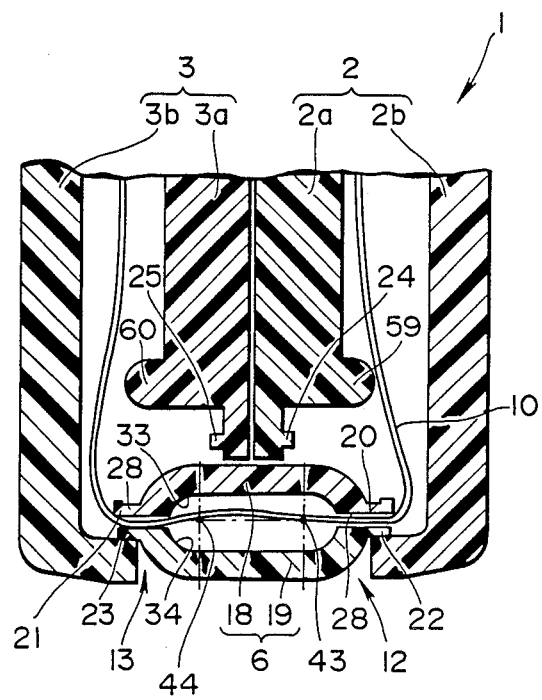
FIG. 3 is an enlarged sectional view of the connection section when the casing components shown in FIG. 1 are closed.

FIG. 1 is an exploded perspective view of a foldable electronic calculator of a small size, for example, a pocket size. FIG. 2 is an enlarged cross section of an important part of the electronic calculator shown in FIG. 1 in the state wherein a casing of the electronic calculator is opened. FIG. 3 is an enlarged cross section of an important part of the electronic calculator shown in FIG. 1 in the state wherein the casing of the calculator is closed.

A device casing 1 is constituted by a pair of casing components 2 and 3 made of synthetic resin. The casing component 2 comprises an upper casing portion 2a and a lower casing portion 2b, and the casing component 3 comprises an upper casing portion 3a and a lower casing portion 3b (see FIGS. 2 and 3). The casing components 2 and 3 are coupled by a rectangular hinge member 6 made of synthetic resin. The hinge member 6 comprises an upper hinge portion 18 and a lower hinge portion 19 (see FIGS. 2 and 3). A keyboard for inputting data is stored in the casing component 2. On the other hand, the casing component 3 stores a circuit board 8 having an electronic part such as an IC chip (not shown) for processing data input by the keyboard 7 and a liquid crystal panel 9 for displaying the result of the processing. The keyboard 7 and the circuit board 8 are electrically connected by a flexible connection member 10, and the circuit board 8 and the liquid crystal panel 9 are electrically connected by a flexible connection member 11.

The upper and lower casing portions 2a and 2b of the casing component 2 have notches 14 and 17 on one side. The notches 14 and 17 form a hinge storing section 12 for storing a half portion of the hinge member 6. The upper and lower casing portions 3a and 3b of the casing component 3 have notches 15 and 16 on the other side facing the notches 14 and 17. The notches 15 and 16 form a hinge storing section 13 for storing the other half portion of the hinge member 6. The upper hinge portion 18 and lower hinge portion 19 of the hinge member 6 have substantially symmetrical shapes. In other words, each of the hinge portions 18 and 19 has a central portion having a trapezoidal cross section, and flat flanges 20 and 21 (22 and 23) at both edges. The flanges 20 and 21 of the upper hinge portion 18 are engaged with projections 24 and 25 (FIG. 2) formed on the upper casing portions 2a and 3a, respectively. A wide and shallow groove 28 for passing the connection member 10 through, by which the keyboard 7 and the circuit board 8 are electrically connected, is formed in a central area of the bottom surface of the upper hinge portion 18. Semi-circular cylindrical recesses 33 and 34 are respectively formed in inner surfaces of the upper and lower hinge portions 18 and 19. A pair of walls 30 defining the recess 34 are provided at both end portions in the longitudinal direction of the lower hinge portion 19. Though not shown, another pair of walls 30 defining the recess 33 are similarly formed at both end portions in the longitudinal direction of the upper hinge portion 18. Bosses 36 with threaded holes 35 are formed as part of the lower hinge portion 18 so as to project toward the recess 33. A pair of semi-circular cylindrical grooves 37 and 38 extend in the longitudinal direction on walls 30 of both the upper and lower hinge portions 18 and 19. Screw holes 39 for insertion of screws (not shown) are formed at both end portions of each of flanges 20, 21, 22, 23 of the upper and lower hinge portions 18 and 19. The hinge portions 18 and 19 are coupled by the screws.

The lower hinge portion 19 having the above structure is put in the notches 16 and 17 in the state wherein the recess 34 faces upward. The flanges 22 and 23 at both edges of the lower hinge portion 19 are placed on flanges 40 and 41 in the hinge storing sections 12 and 13. Metallic U-shaped support shafts 42 are fitted in the paired grooves 37 and 38 at both the walls 30 of the lower hinge portion 19. End portions of shaft portions 43 and 44 of each support shaft 42 are inserted into holes 45 and 46 formed at extreme ends of the notches 16 and 17 in parallel to the grooves 37 and 38. In this state, each of threaded axis portions of screws 47 is passed through the space between the shaft portions 43 and 44 of each U-shaped shaft 42 and is engaged in the threaded hole 35 of the corresponding boss 36. Thus, the shaft portions 43 and 44 of each U-shaped shaft 42 are pressed on the outer face of the boss 36 by a head portion of the screw 47 and fixed on the lower hinge portion 19.

The upper hinge portion 18 is placed over the lower hinge portion 19 such that the flexible connection member 10 is put in the groove 28, and facing the recess 33 downward, the flanges 20 and 21 of the upper hinge portion 18 are superposed on the flanges 22 and 23 of the lower hinge portion 19. These flanges are coupled tightly by engaging screws (not shown) into the screw holes 39. As a result, the casing components 2 and 3 are rotatably coupled by means of the hinge member 6.

An opening 49 having a size slightly smaller than the size of the keyboard 7 is formed in the upper casing portion 2a of the casing component 2 for storing the keyboard 7. An opening 51 is formed in the upper casing portion 3a of the casing component 3 for displaying the liquid crystal display panel 9. The upper casing portions 2a and 3a are superposed on the respective lower casing portions portions 2b and 3b, and these portions are clamped by screws or the like (not shown). In case of combining the upper casing portions 2a and 3a with the lower casing portions 2b and 3b, the upper hinge portion 18 is put in the notches 16 and 17 in the state wherein the flanges 20 and 21 of the upper hinge portion 18 are engaged with the projections 24 and 25 of the upper casing portions 2a and 3a.

The keyboard 7 comprises a rubber operation board 53 having a number of hollow mesa-type operation sections 52, and a contact sheet 56 integrally composed of a movable contact sheet 54 and a fixed contact sheet 55 (a spacer layer is printed on one of both sheets). The operation board 53 is laminated and fixed on the contact sheet 56 by an adhesive. This type of keyboard 7 is well known in the art. When the operation section 52 is depressed, the contact sheet 56 is deformed so that a movable contact corresponding to the depressed operation section 52 is brought into contact with the fixed contact. When the depression of the operation section 52 is released, the movable contact is separated from the fixed contact by virtue of the restoring force of the contact sheet 56.

In the portable electronic calculator having the above structure, the keyboard 7 stored in one casing component 2 is electrically connected to the circuit board 8 and liquid crystal display panel 9 stored in the casing component 3 by the connection member 10 passed through the hinge member 6. In this case, the connection member 10 for electrically connecting the keyboard 7 and the circuit board 8 is arranged so as to cross the upper surface of the lower hinge portion 19. When the upper hinge portion 18 is coupled to the lower hinge portion 19, the connection member 10 is passed through the groove 28 formed in the lower surface of the upper hinge portion 18 (FIGS. 2 and 3). The connection member 10 passed through the groove 28 is guided by semicircular cylindrical projections 59 and 60 formed on the upper casing portions 2a and 3a (FIGS. 2 and 3). The projections 59 and 60 serve to push out that portion of the connection member 10 which may be caught between the projections 24 and 25 in notches 14 and 15 and the flanges 20 and 21 of the upper hinge portion 18.

In the above portable electronic calculator, the casing component 2 storing the keyboard 7 is rotated about the shaft portion 43 of the support shaft 42 fixed on the hinge member 6. On the other hand, the casing component 3 storing the circuit board 8 and liquid crystal display panel 9 is rotated about the shaft portion 44 of the support shaft 42. Even when the casing components 2 and 3 are opened or closed, the hinge member 6 does not produce a gap between the facing side portions of the casing components 2 and 3. Thus, the external appearance of the device is good, and the connection member 10 is passed through the hinge member 6 and is not exposed to the outside. The connection member 10 is, therefore, not damaged by an external member. Since the casing components 2 and 3 rotate about different shaft portions 43 and 44, the angle of bending of the connection member 10 is reduced and limited to a range of 0° to 90°. Thus, the less possibility of bringing about broken wiring is attained. In addition, since the hinge member 6 can be taken apart by removing the support shaft 42 fixed by the screws 47, the maintenance of the device becomes easier.

In the above embodiment, the two pieces of U-shaped support shafts 42 were used, it is, of course, possible to use four pieces of shafts. Also, it is possible to use two pieces of shafts having lengths which can bridge the holes 45 (or 46) formed at both ends of the hinge member 6. Furthermore, it is possible to provide the shaft portions, about which the casing components are rotated, formed by molding as part of either of the casing components or the hinge member, thereby to reduce the number of parts of the device. An example of this technique will now be described.

<Second Embodiment>

Figure 4:
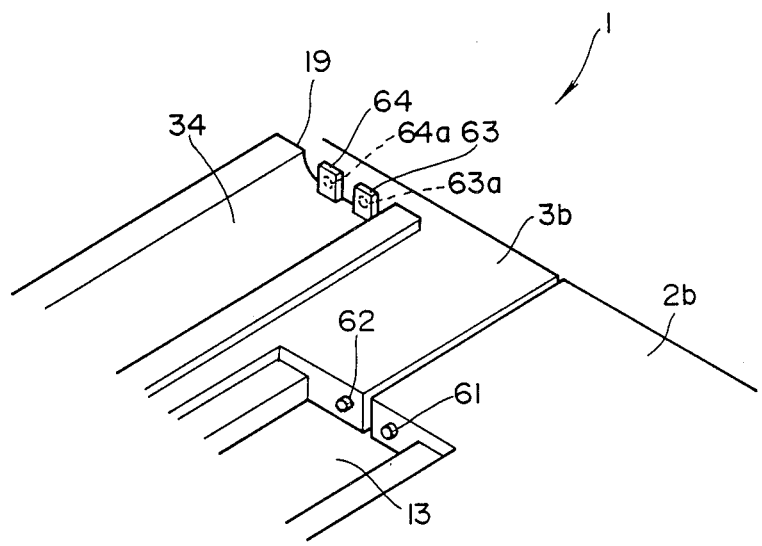
FIG. 4 is an enlarged, exploded perspective view of the connection section of a device casing according to a second embodiment of the present invention.

FIG. 4 shows an enlarged exploded view of a second embodiment of the present invention, which shows, in particular, a connection section between the casing components and the hinge member.

In the second embodiment, a pair of support shafts 61 and 62, each having a small diameter and projecting like a pin, are formed by molding on both end faces (only one face is shown in FIG. 4) in the longitudinal direction of the hinge storing section 13 of the lower casing portions 2b and 3b as parts of casing portions 2b and 3b. On the other hand, right and left vertical walls 63 and 64 are formed by molding at each of both ends (only one end is shown in FIG. 4) of the recess 34 of the lower hinge portion 19 as part of hinge portion 19. A pair of recess portions 63a and 64a to be engaged with the support shafts 61 and 62 are formed in the outer faces of the vertical walls 63 and 64. The vertical walls 63 and 64 have elasticity. It is possible to engage the recess portions 63a and 64a with the support shafts 61 and 62 while the vertical walls 63 and 64 are bent inward. Thus, the casing components 2 and 3 rotate about the different support shafts 61 and 62. In the case where a pair of support shafts (or projections) and a pair of recess portions are engaged with one another, as in the above case, it is possible to provide the projections on the lower hinge portion 19 and the recesses in the lower casing portions 2b and 3b.

In the above embodiments, the casing component 2 is simply opened and closed, relative to the casing component 3. However, it is possible to employ a structure wherein the casing component 2 can be kept at a given angle with respect to the casing component 3. A third embodiment of the present invention, which has such a structure, will now be described.

<Third Embodiment>

FIGS. 5 to 10 illustrate a third embodiment of the present invention.

Figure 10:
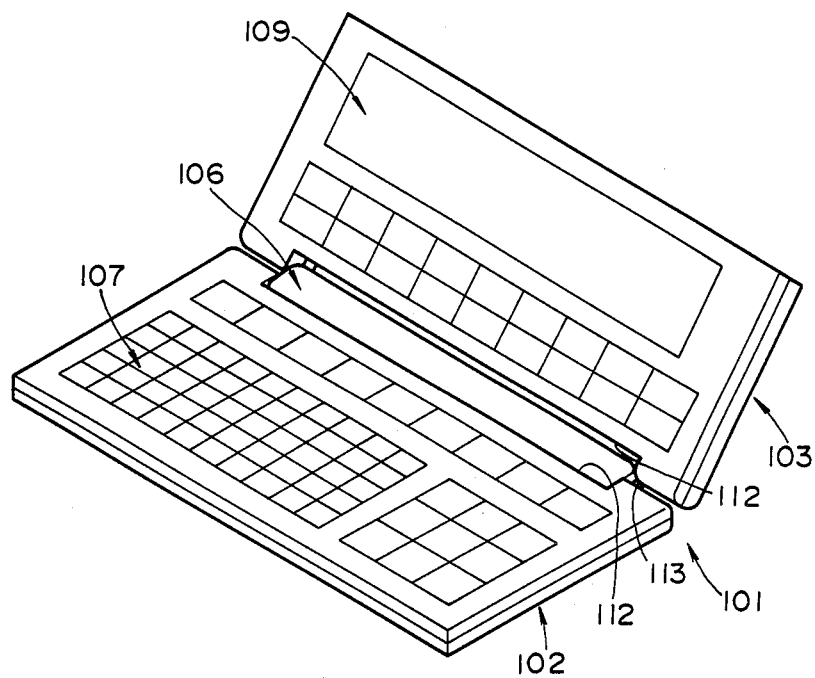
FIG. 10 is a perspective view showing the external appearance of a portable electronic calculator having the device casing shown in FIG. 5.

FIG. 10 shows an external appearance of a portable electronic calculator of the so-called foldable type.

This portable electronic calculator comprises a device casing 101 having casing components 102 and 103. Hinge storing sections 112 and 113 are provided at regions of connection between the casing components 102 and 103. A long and wide hinge member 106 is arranged in the hinge storing section 112 and 113. As will be described later, the casing components 102 and 103 are coupled to the hinge member 106 so as to be rotatable about different axes. A keyboard 107 for inputting information such as calculation data is housed in one casing component 102. A liquid crystal display panel 109 (hereinafter, referred to as "LCD panel 109") for displaying calculation data input from the keyboard 107 and a calculation result is housed in the casing component 103. A circuit board (not shown), on which a plurality of electronic parts constituting an electronic circuit unit of the portable electronic calculator are mounted, is disposed in a portion of the casing component 103 which is located below the LCD panel 109. The circuit board is electrically connected to the liquid crystal panel 109 by means of a flexible film, not shown in FIG. 10.

FIGS. 5 to 9 are enlarged cross sections of the connection section of the device casing according to the third embodiment.

The casing component 102 comprises lower casing portion 102b and an upper casing portion 102a which are coupled by screws (not shown). The casing component 103 comprises a lower casing portion 103b and an upper casing portion 103a which are coupled by screws (not shown).

The hinge member 106 comprises a lower hinge portion 119 and an upper hinge portion 118 which are substantially symmetrical in shape. The hinge portion 118 has flanges 120 and 121 at both ends in the direction of width, and similarly the hinge portion 119 has flanges 122 and 123. The flanges 120 and 121 and the flanges 122 and 123 are superposed on one another, and are coupled by screws (not shown), thereby to constitute the hinge member 106. The casing component 102 is attached to the hinge member 106 so as to be rotatable about one support shaft 143 fixed on the hinge member 106. The casing component 103 is attached to the hinge member 106 so as to be rotatable about the other support shaft 144 fixed on the hinge member 106. In other words, the casing components 102 and 103 are coupled so as to be rotatable about different support shafts 143 and 144.

Grooves 128 are formed on the upper side of the flanges 122 and 123 of the lower hinge portion 119. A flexible connection member 110 is passed through the grooves 128. The flexible connection member 110 serves to electrically connect the keyboard 107 disposed in the casing component 102 and the circuit board disposed in the casing component 103. One end of the connection member 110 is connected to the keyboard 107, and the other end of the connection member 110 is connected to the circuit board. A middle portion of the connection member 110 is passed through the grooves within the hinge member 106.

An inclination retaining mechanism 170 is provided in the vicinity of a hinge storing section 112 within the casing component 103. The inclination retaining mechanism 170 comprises a cam member 171, a compression coil spring 175 for pushing the cam member 171 toward the hinge storing section 112, and a support section 177 having a guide groove 176 for guiding the sliding movement of the cam member 171. The cam member 171 is integrally formed of a contact portion 172 and a sliding portion 174. The sliding portion 174 is inserted into the guide groove 176, and one end portion of the sliding portion 174 is engaged with a ring 178 so as not to disengage the sliding portion 174 from the support section 177. Though the support section 177 is formed integral with the upper casing portion 103a, it is possible to form the support section 177 separately from the upper casing portion 103a. The compression coil spring 175 is located between the cam member 171 and the support section 177 to push out the cam member 171 in a direction of arrow A. In the normal state, the ring 178 is abutted upon the support section 177. As will be described later, the contact portion 172 includes a flat cam surface 173a engaging with the flange 120 of the upper hinge portion 118, and a curved cam surface 173b continuous with the flat cam surface 173a.

The opening and closing operation of the device casing of the third embodiment will now be described.

Figure 5:
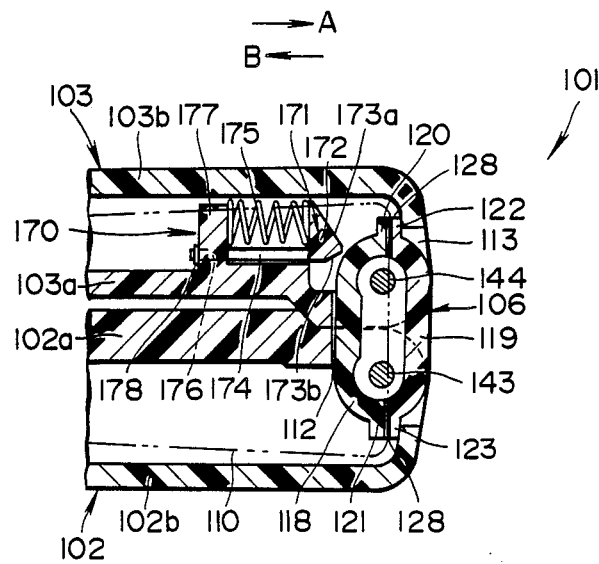
FIG. 5 is an enlarged sectional view of the connection section when a device casing according to a third embodiment of the present invention is closed.

FIG. 5 shows the state wherein the casing component 103 is closed with respect to the other casing component 102. In this state, the casing component 103 is superposed on the upper surface of the casing component 102, and the hinge member 106 is located substantially in a vertical direction. The flexible connection member 110 is bent substantially at right angles at both ends of the hinge member 106. The ring 178 attached to the sliding portion 174 of the cam member 171 is abutted upon the support section 177.

Figure 6:
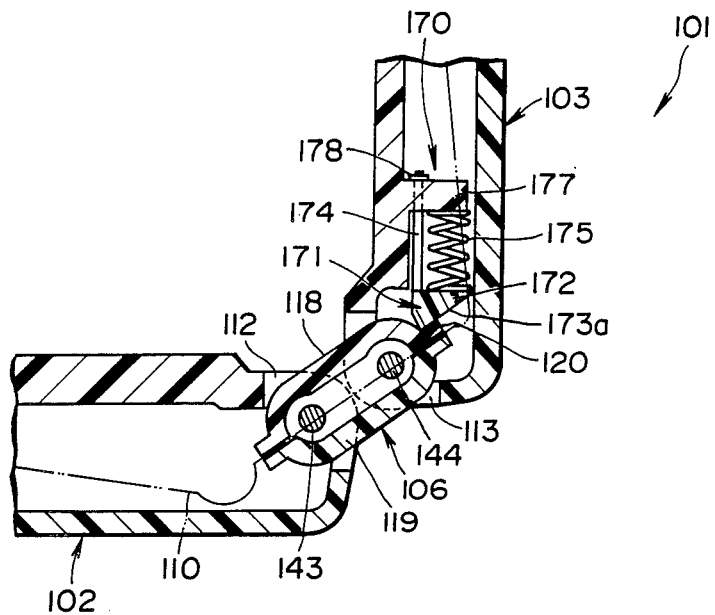
FIG. 6 is an enlarged sectional view showing the state in which the device casing shown in FIG. 5 is opened at right angles.

When the casing component 103 is opened relative to the casing component 102, the casing component 103 rotates about the support shaft 144. FIG. 6 shows the state wherein the casing component 103 rotates about the support shaft 144 by 45°. In this state, the cam surface 173a of the cam member 171 is brought into contact with the flange 120 of the upper hinge portion 118. Since the hinge member 106 rotates about the support shaft 143 relative to the casing component 102, the angle formed between the casing components 102 and 103 becomes about 90°. As a result, as shown in FIG. 6, the casing component 103 is opened substantially in a vertical position with respect to the casing component 102. In this state, the surface 173a of the cam member 171 is urged on the flange 120 by an elastic force of the compression coil spring 175. However, excepting a rotational friction between the support shaft 143 and the casing component 102, no resistive force acts on the relative rotation of the casing component 102 and the hinge member 106.

If the casing component 103 is further rotated relative to the casing component 102, both the casing component 103 and the hinge member 106 rotate as one piece about the support shaft 143, and the flange 121 of the upper hinge portion 118 abuts against that portion of the inner surface of upper casing portion 102a of casing component 102, which is close to the hinge storing section 112. In this state, the rotation of the hinge member 106 is stopped, since the cam surface 173a of the cam member 171 abuts upon the flange 120 of the upper hinge portion 118 and, on the other hand, the flange 121 of the upper hinge portion 118 abuts upon the inner surface of the upper casing portion 102a of casing component 102. As a result of the rotation of the hinge member 106 being stopped, the rotation of the casing component 103 is also stopped temporarily. In other words, even if the user removes his hand from the casing component 103, the casing component 103 is kept at the inclined state as shown in FIG. 7, i.e., at an angle a little greater than 90° with respect to the casing component 102.

Figure 7:
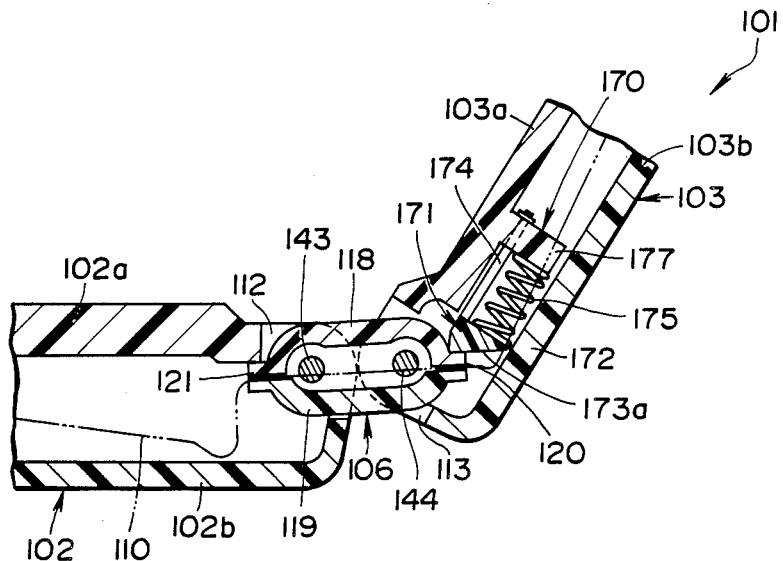
FIG. 7 is an enlarged sectional view showing the state in which the device casing shown in FIG. 5 is further opened from the position shown in FIG. 6.
Figure 8:
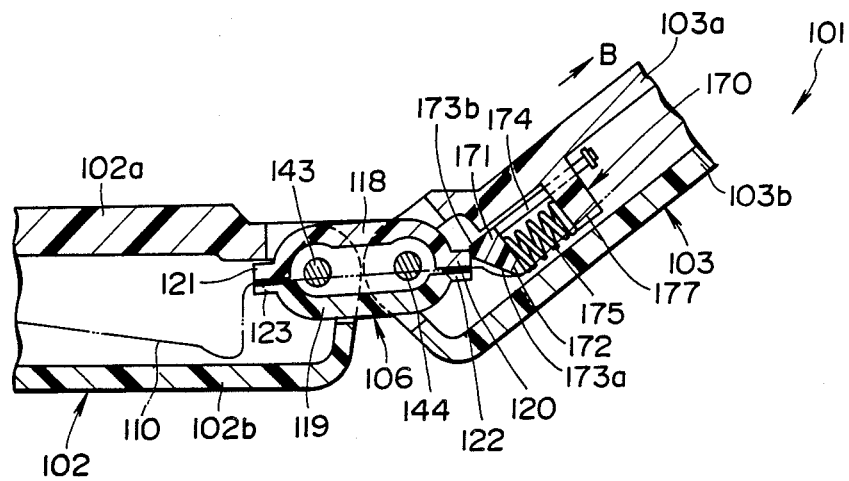
FIG. 8 is an enlarged sectional view showing the state in which the device casing shown in FIG. 5 is further opened from the position shown in FIG. 7.

FIG. 8 shows the state wherein the casing component 103 is further opened relative to the casing component 102, from the position shown in FIG. 7. At first, the cam surface 173b of the cam member 171 is put in contact with an end face of the flange 120 of the upper hinge portion 118. Then, the cam surface 173b is brought into contact with an end face of the flange 122 of the lower hinge portion 119. Consequently, the cam member 171 is moved by a given degree in the direction of arrow B against the spring force of the compression coil spring 175. Since the casing component 103 is opened against the force of the compression coil spring 175, a suitable amount of load is applied on the rotation of the casing component 103.

Figure 9:
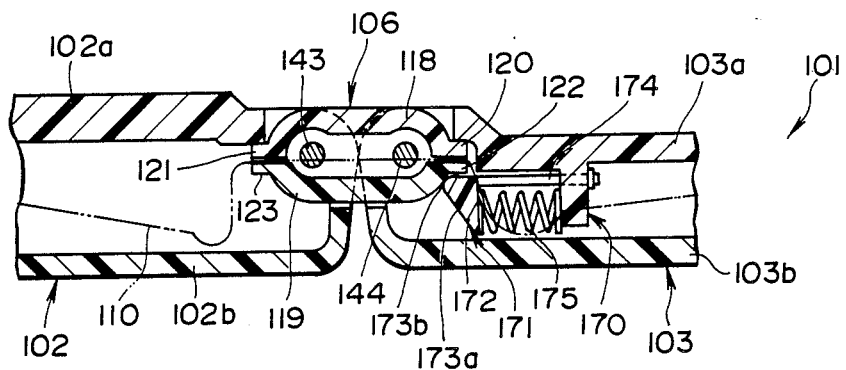
FIG. 9 is an enlarged sectional view showing the state in which the device casing shown in FIG. 5 is opened at a maximum degree.

FIG. 9 shows the state wherein the casing component 103 is further opened relative to the casing component 102, from the position shown in FIG. 8. The contact portion 172 of the cam member 171 moves to a position under the flange 122 of the lower hinge portion 119. In accordance with the movement of the contact portion 172, the cam member 171 is restored to its initial position by virtue of a spring force of the compression coil spring 175. As a result, the flanges 120 and 122 of the hinge member 106 is placed between the inner face of the upper casing portion 103a of the casing component 103 and the contact portion 172 of the cam member 171. In other words, in this state, the inner face of the upper casing portion 103a of casing component 103 abuts upon the flange 120 of the upper hinge portion 118, whereby the further rotation of the casing component 103 is prevented. Also, the contact portion 172 of the cam member 171 faces the flange 122 of the lower hinge portion 119, so that the rotation of the casing component 103 in the reverse direction, i.e., in the direction of closing, can be temporarily prevented. In the state shown in FIG. 9, the casing component 103 is opened in relation to the other casing component 102 to a maximum degree, i.e., 180°.

On the other hand, when the casing component 103 set in the position shown in FIG. 7 is closed, the casing component 103 can be closed with a relatively weak force, since the flange 121 of the upper hinge portion 118 is simply placed in contact with the inner face of the upper casing portion 102a of casing component 102 and the cam surface 173a of cam member 171 is simply placed on the flange 120 of the upper hinge portion 118.

When the casing component 103 set in the position shown in FIG. 8 is closed, a suitable load is applied on the casing component 103, since the cam surface 173a of cam member 171 is pressed by the end face of the flange 120 of the upper hinge portion 118 and the cam member 171 moves to some extent in the direction of arrow B while compressing the coil spring 175. Consequently, when the casing component 103 is rotated from the position shown in FIG. 8 to the position shown in FIG. 7, a relatively strong force is required.

When the casing component 103 set in the position shown in FIG. 9 is closed, a considerably strong force needs to be applied to the casing component 103 so that the flange 122 of the lower hinge portion 119 presses the cam surface 173b of the contact portion 172. As a result, the cam member 171 moves in the direction of arrow B while compression the coil spring 175. Thus, at the initial stage of the closing operation of the casing component 103, a greater force is required than in the case where the casing component 103 is closed from the position shown in FIG. 8.

As described above, in the structure of the device casing according to the third embodiment of the invention, when the casing component 103 is opened relative to the casing component 102, by an angle slightly greater than 90°, as shown in FIG. 8, the casing component 103 can be kept in this state. The casing component 103 in this state is also shown in FIG. 10. In the state shown in FIG. 9, wherein the casing component 103 is opened to a maximum degree, the rotation of the casing component 103 is restricted in both directions. Thus, the operation of the keyboard contained in the casing component 103 can be performed in the stable condition. It may be possible to provide steps in the cam surfaces 173a and 173b of the cam member 171, so that the casing component 103 can be held in stepwise manner. In the case where the casing component 103 is opened and closed relative to the casing component 102 at an angle slightly greater than 90°, as shown in FIG. 7, the force of the inclination retaining mechanism 170 does not act on the casing component 103. Thus, the opening and closing of the casing component 103 can be carried out by a relatively weak force.

In the above embodiment, the inclination retaining mechanism 170 is arranged in the casing component 103. However, it is possible to arrange the inclination retaining mechanism 170 in the other casing component 102. Alternatively, the inclination retaining mechanism 170 may be provided in each of the casing components 102 and 103. Furthermore, the casing component 103 can be designed so as not to be further opened from the position shown in FIG. 7. In this case, the provision of the compression coil spring 175 is omitted, and the cam member 171 is fixed on the casing component 103, for example, by means of a screw.

A description will now be given of an embodiment wherein the casing component 103 can be held at different inclination angles.

<Fourth Embodiment>

FIGS. 11 to 20 show a fourth embodiment of the present invention.

In the device casing 101 according to the fourth embodiment, the inclination retaining mechanism 170 used in the third embodiment is replaced with an inclination retaining mechanism 180 shown in FIG. 11 and FIGS. 12A and 12B.

The inclination retaining mechanism 180 will now be described with reference to FIG. 11 and FIGS. 12A and 12B.

The inclination retaining mechanism 180 is provided at one portion of a connection section between the hinge member 106 and the casing component 103. The inclination retaining mechanism 180 comprises a fixed ratchet 181 and a movable ratchet structure 183. The fixed ratchet 181 comprises a tooth section 182 having radially extending teeth and formed on a connection face of the upper and lower casing portions 103a and 103b of the casing component 103. The connection face is designed to be engaged with the hinge member 106.

The upper and lower casing portions 103a and 103b are provided with halves 146a and 146b forming a cylindrical shaft hole 146 each having a semi-circular cross section and extending in a direction perpendicular to the tooth section 182 of the fixed ratchet 181. When the upper and lower casing portions 103a and 103b are combined, a cylindrical shaft hole 146 is formed at a central area of the fixed ratchet 181.

The movable ratchet structure 183 comprises a ring-shaped ratchet section 185 having at one end face thereof a tooth section 184 with radially extending teeth, a cylindrical shaft member 186 provided at a central area of the other end face of the ratchet section 185, a shaft hole 187 formed in a central portion of each of the ratchet section 185 and the cylindrical shaft member 186, and a groove 188 formed in the outer peripheral surface of the ratchet section 185.

A support shaft 144 is slidably and rotatably inserted into the shaft hole 187 of the movable ratchet structure 183. In this state, the tooth section 184 of the movable ratchet structure 183 faces the tooth section 182 of the fixed ratchet 181. An end face of the shaft member 186 of the movable ratchet structure 183 is provided with a compression coil spring 190 for pressing the movable ratchet structure 183 toward the fixed ratchet 181. The compression coil spring 190 is fitted on the support shaft 144. The support shaft 144 is formed in an L-shape, and the support shaft 144 is bent at a corner portion 144b and is extended in a direction perpendicular to the face of FIG. 11. The corner portion 144b is abutted upon a wall 104 of the hinge member 106.

A ratchet receiving section 191 is integrally formed in a connection section of the upper and lower hinge portions 118 and 119. The ratchet receiving section 191 has a through-hole composed of a large hole 192 and a small hole 193 both corresponding to the external shape of the movable ratchet structure 183. A projection 194 extending in the axial direction is provided on the inner wall of the large hole 192. The ratchet section 185 and the shaft member 186 of the movable ratchet structure 183 are fitted in the large hole 191 and the small hole 192. In this case, the groove 188 of the movable ratchet structure 183 is engaged with the projection 194, so that the rotation of the movable ratchet structure 183 within the ratchet receiving section 191 is prevented while the movable ratchet structure 183 is allowed to slide within the ratchet receiving section 191.

The other elements of the fourth embodiment have substantially the same structures as those of the corresponding elements in the third embodiment. Therefore, these elements are accompanied with the same reference numerals as have been used in the third embodiment, and descriptions thereof may be omitted.

The opening and closing operation of the device casing according to the fourth embodiment will now be described.

Figure 13:
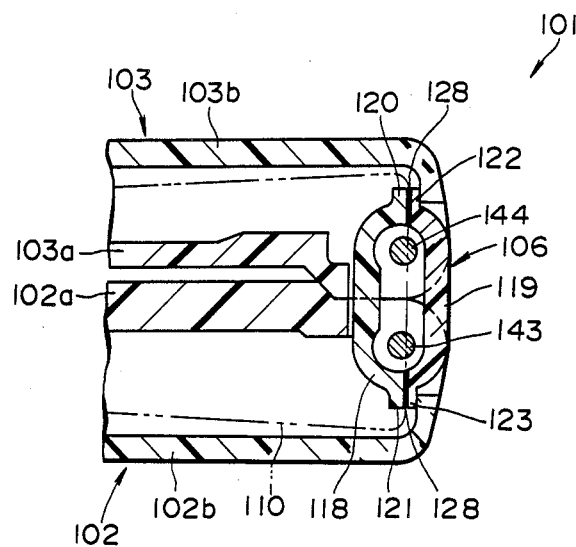
FIG. 13 is an enlarged sectional view of the connection section of the device casing, which is taken in a direction perpendicular to the axis of the connection section.

FIGS. 11 and 13 show the state wherein the casing component 103 is closed with respect to the casing component 102. In this state, as shown in FIG. 13, the casing component 103 is superposed on the upper surface of the casing component 102, and the hinge member 106 is erected substantially in a vertical direction. As shown in FIG. 11, the tooth section 184 of the ratchet section 185 of the movable ratchet structure 183, which is pressed by the compression coil spring 190 is engaged with the tooth section 182 of the fixed ratchet 181.

On the other hand, no substantial resisting force acts on a support shaft 143 fixed in the hinge member 106 or on the casing component 102.

Figure 14:
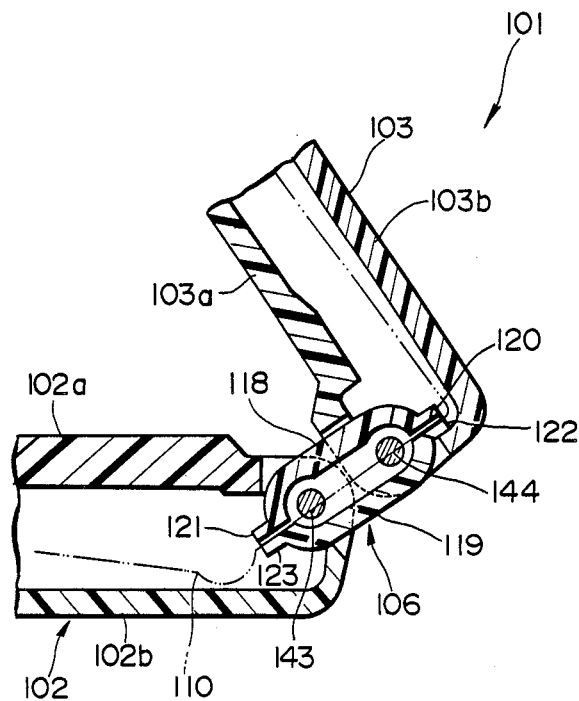
FIG. 14 is an enlarged sectional view showing the state in which the device casing shown in FIG. 13 is opened at about 45°.

FIG. 14 shows the state wherein the casing component 103 is opened relative to the casing component 102, from the position shown in FIG. 13. In this case, while the positional relationship between the casing component 103 and the hinge member 106 is unchanged, the combination of the casing component 103 and the hinge member 106 rotates about the support shaft 143. Namely, the combination of the casing component 103 and the hinge member 106 rotates smoothly with no substantial resistance, in relation to the casing component 102.

Figure 15:
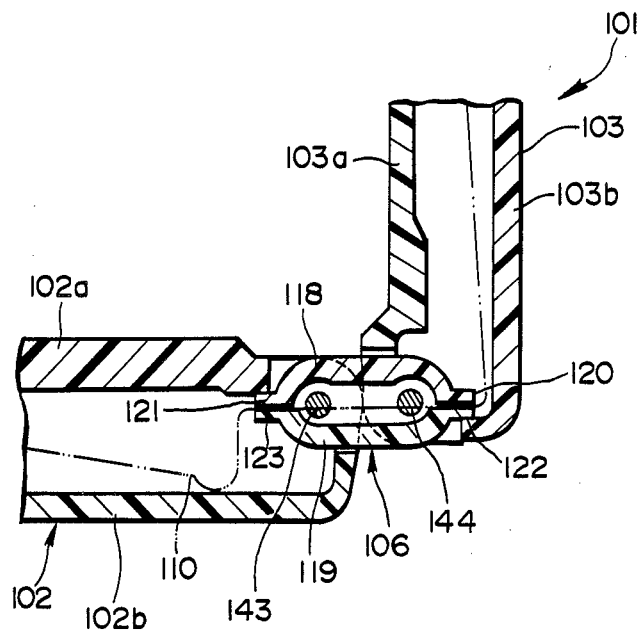
FIG. 15 is a sectional view showing the state in which the device casing shown in FIG. 13 is opened at right angles.

FIG. 15 shows the state wherein the casing component 103 is further opened, substantially at right angles with the casing component 102. In this state, the hinge member 106 is substantially in parallel to the casing component 102. A flange of the hinge member 106 abuts upon the inner surface of the casing component 102, and the hinge member 106 is prevented from further rotating. As a result, the rotation of the casing component 103 is temporarily stopped, and the casing component 103 is kept in a substantially vertical position with respect to the casing component 102.

Figure 16:
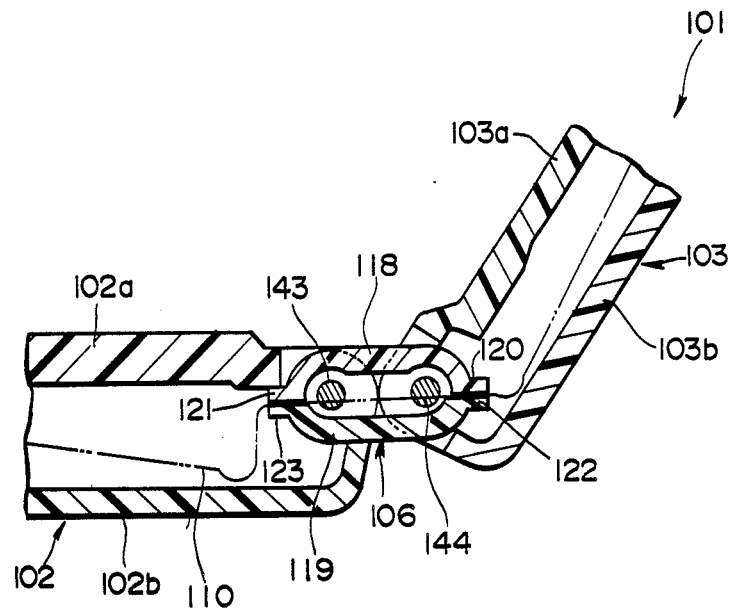
FIG. 16 is an enlarged sectional view showing the state in which the device casing shown in FIG. 13 is further opened from the position shown in FIG. 15.
Figure 19:
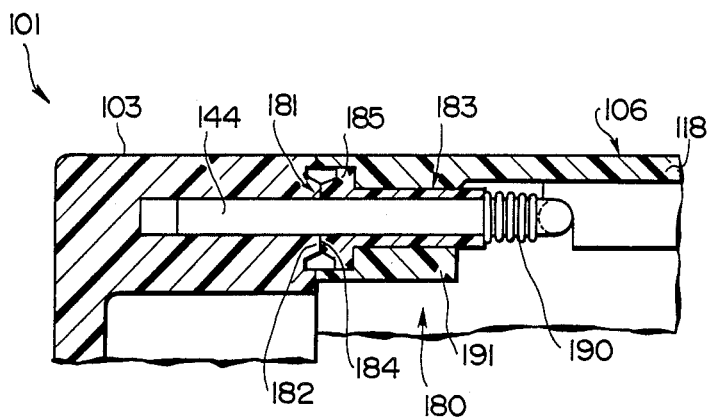
FIG. 19 is an enlarged sectional view showing a different state of operation of the inclination retaining mechanism shown in FIG. 11.

FIG. 16 shows the state wherein the casing component 103 is further opened, from the position shown in FIG. 15. In this case, the inclination retaining mechanism 180 functions. In the state shown in FIG. 15, the flange 121 of the hinge member 106 abuts upon the inner surface of the upper casing portion 102a of the casing component 102. Thus, when the casing component 103 is further opened, it must be rotated about the support shaft 144 against the force of the compression coil spring 190 of the inclination retaining mechanism 180. In other words, a resisting force of the compression coil spring 190 is applied to the casing component 103. When the casing component 103 is rotated in the opening direction, the fixed ratchet also rotates along with the casing component 103. The tooth portion 182 of the fixed ratchet 181 rotates about the support shaft 144. In this case, as shown in FIG. 19, the tooth section 184 of the movable ratchet structure 183 moves away from the tooth section 182 of the fixed ratchet 181 against the force of the compression coil spring 190. Then, the tooth section 184 is engaged with the tooth section 182 by virtue of the restoring force of the compression coil spring 190, as shown in FIG. 11. This operation of the tooth sections 184 and 182 is repeated, while the casing component 103 is being rotated about the support shaft 144. As stated above, when the casing component 103 is further opened from the position shown in FIG. 15, the casing component 103 is rotated against the force of the compression coil spring 190, and a predetermined resisting force is applied to the casing component 103. In this case, even when the tooth section 182 of the fixed ratchet 181 is positioned to face grooves of the tooth section 184 of the movable ratchet 183, for example, when the casing component 103 is opened in a position as shown in FIG. 17, the casing component 103 is held in the inclined position shown in FIG. 17 by virtue of the engagement of both ratchets 181 and 183.

Figure 17:
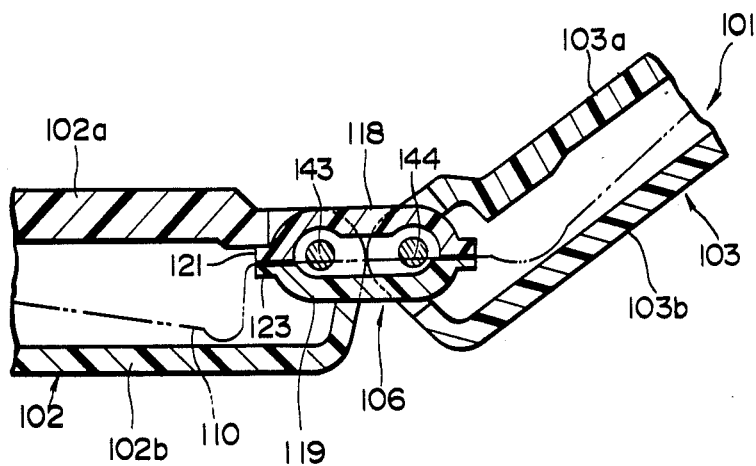
FIG. 17 is an enlarged sectional view showing the state in which the device casing shown in FIG. 13 is further opened from the position shown in FIG. 16.
Figure 18:
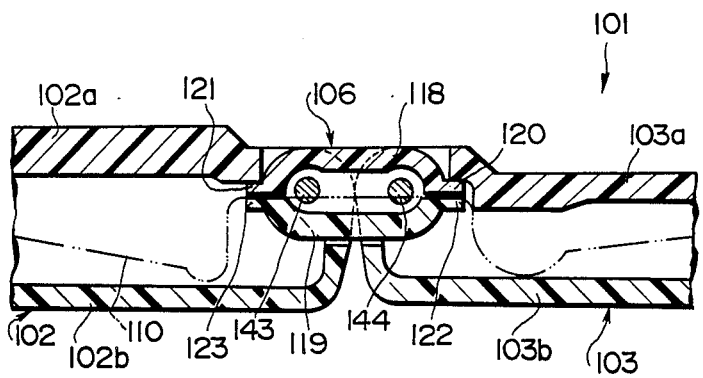
FIG. 18 is an enlarged sectional view showing the state in which the device casing shown in FIG. 13 is opened at a maximum degree.

FIG. 18 shows the state wherein the casing component 103 is further opened from the position shown in FIG. 17. The inner surface of the upper casing portion 103a of the casing component 103 abuts upon a flange 120 of the upper hinge portion 118, so that the casing component 103 is prevented from further rotating.

The closing operation of the device casing according to the fourth embodiment will now be described.

When the casing component 103 is set in the inclined position shown in FIG. 14 or FIG. 15, the support shaft fixed in the hinge member 106 can rotate relative to the casing component 102, with no substantial resisting force. In this case, the casing component 103 may be closed by its own weight. However, in this state, the liquid crystal display panel 109 disposed in the casing component 103 faces the keyboard 107 disposed in the casing component 102 in a downward direction, and, therefore, the situation in which the casing component 103 gets to close by its own weight does not occur in the normal state of use. Thus, it is very rare that the casing component 103 is closed from the position shown in FIG. 14 or FIG. 15. It may be possible that, for the purpose of a test of the opening and closing operation, the casing component 103 is closed from the position shown in FIG. 14 or FIG. 15. In this case, the casing components 102 and 103 are surely held by the hands, and the casing component 103 is not suddenly closed by its own weight.

In the states shown in FIGS. 16, 17 and 18, the casing component 103 is rotated about the support shaft 144, and the inclination retaining mechanism 180 functions.

In other words, the tooth section 182 of the fixed ratchet 181 engages with the tooth section 184 of the movable ratchet structure 183, and this engagement is maintained by the force of the compression coil spring 190. If the casing component 103 is rotated about the support shaft 144 in the closing direction, a force to compress the coil spring 190 is required. On the other hand, the other casing 102 can rotate about the shaft 143 fixed in the hinge member 106, with no substantial resisting force. Thus, when an external force is applied to the casing component 103 in the state shown in FIG. 16 so that the casing component 103 can be closed, the combination of the casing component 103 and the hinge member 106 is rotated about the support shaft 143 in relation to the casing component 102, while the positional relationship between the casing component 103 and the hinge member 106 is maintained. When a flange of the lower hinge portion 119 of the hinge member 106 is placed in contact with the inner surface of the lower casing portion 102b of the casing component 102, the casing component 103 is temporarily stopped or the rotation speed of the casing component 103 is lowered. The reason for this is that, in the state shown in FIG. 20, the inclination retaining mechanism 180 functions so that the compression coil spring 190 prevents the casing component 103 from rotating relative to the hinge member 106. In the state shown in FIG. 20, whether the rotation of the casing component 103 is stopped or slowed can be freely decided, depending on the degree of the force of the compression coil spring 190.

Figure 20:
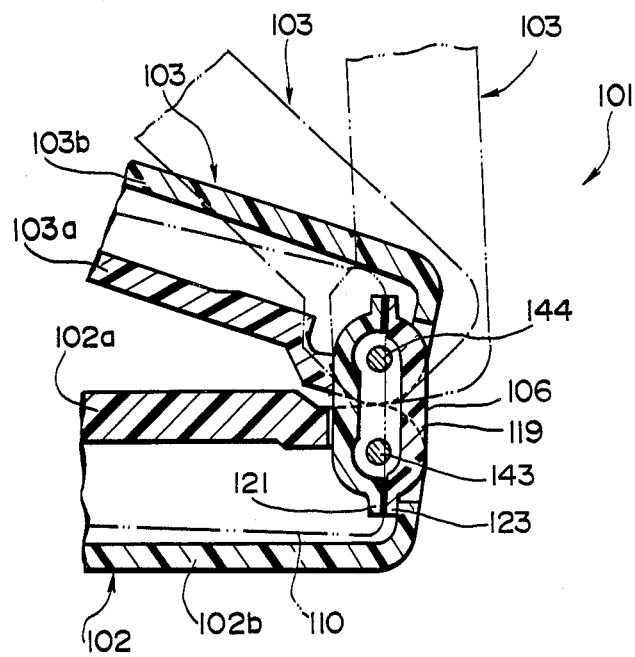
FIG. 20 is an enlarged sectional view for explaining the operation for closing the device casing shown in FIG. 16.

It is obvious that the position where the casing component 103 starts to rotate about the support shaft 144 in the closing direction corresponds to the position where the casing component 103 is fixed after being rotated about the support shaft 144 in the opening direction. In other words, a braking start position where the flange 123 of the hinge member 106 abuts upon the inner surface of the lower casing portion 102b of the casing component 102 differs in the cases shown in FIGS. 16, 17 and 18. In FIG. 20, a braking start position of the casing component 103 which is closed from the position shown in FIG. 17 is indicated by a dot-and-dash line, and a braking start position of the casing component 103 which is closed from the position shown in FIG. 18 is indicated by a two-dot-and-dash line.

When the casing component 103 is further closed from the position shown in FIG. 20, it is necessary that the tooth section 184 of the movable ratchet structure 183 be disengaged from the tooth section 182 of the fixed ratchet 181 against the force of the compression coil spring 190. Thus, the casing component 103 is slowly closed.

As described above, in the fourth embodiment, the casing component 103 can be held at different angles relative to the other casing component 102, in the range from the position shown in FIG. 15 (substantially vertical position) to the position shown in FIG. 18 (substantially horizontal position). For example, the casing component 103 can be held in the position shown in FIG. 16 or FIG. 17. When the casing component 103 set in the position shown in FIG. 16, 17 or 18 is closed, even if an external strong force is applied to the casing component 103, the sudden closing of the casing component of the casing component 103 can be prevented by virtue of the resisting force acting in the inclination retaining mechanism 180 in the later stage of the closing. Thus, the safety of the device casing can be ensured.

In the forth embodiment, the fixed ratchet 181 is provided on the casing component 103 and the movable ratchet structure 183 is provided on the hinge member 106. However, it is possible to provide the fixed ratchet 181 on the hinge member 106, and the movable ratchet structure 183 on the casing component 103. In this embodiment, the movable ratchet structure 183 and the support shaft 144 are formed separately from each other. However, the movable ratchet structure 103 and the support shaft 144 can be integrally formed, for example, of synthetic resin. In addition, one of the tooth sections 182 and 184 may be formed partly, and not entirely, on the ratchets 181 or 183. The tooth sections 182 and 184 may be replaced with friction sheets such as felt sheets. The compression coil spring 190 may be replaced with a leaf shaped spring.

As described above, in the device casing of the present invention, the connection member for connecting the electronic parts contained in the paired casing components is not exposed to the outside. Thus, the connection member can be protected from external damage, and the external appearance of the device casing can be improved. Since the casing components rotate about different shafts provided in the hinge member, the angle of bending or the degree of movement of the connection member, which is involved by the opening and closing operation of both casing components, can be reduced to half. Therefore, the durability of the connection member can be enhanced.

What is claimed is:

1. A device casing structure, comprising:
   first casing means for carrying a given electronic part, said first casing means having a hinge storing section at one end portion thereof;
   second casing means for carrying a given electronic part, said second casing means having a hinge storing section at one end portion thereof which faces said first casing means;
   flexible connection member means for connecting said electronic part carried by said first casing means and said electronic part carried by said second casing means;
   hinge member means comprising a pair of hinge portions, at least one of which has a groove for inserting said flexible connection member means, said hinge member means being arranged within said hinge storing sections of said first and said second casing means, for connecting said first casing means and said second casing means so as to be rotatable relative to each other;
   a first support shaft, arranged in said hinge storing section of said first casing means, for rotatably connecting said first casing means and said hinge member means; and
   a second support shaft, arranged in said hinge storing section of said second casing means, for rotatably connecting said second casing means and said hinge member means;
   wherein said second casing means comprises an upper casing portion and a lower casing portion, and a keyboard is contained between said upper and said lower casing portions.

2. The device casing structure according to claim 1, wherein said first and said second support shafts are formed as a one piece structure having a U-shaped figure.

3. The device casing structure according to claim 1, wherein said first support shaft and said second support shaft are formed on said first casing means and said second casing means, respectively.

4. The device casing structure according to claim 1, wherein said first casing means is provided with inclination retaining mechanism means for stopping the rotation of said first casing means relative to said hinge member means, when said first casing means is rotated around said first shaft through a predetermined angle relative to said hinge member means, thus keeping said first casing means in an inclined position with respect to said second casing means.

5. The device casing structure according to claim 4, wherein said inclination retaining mechanism means includes a cam member slidably attached to the first casing means, and elastic means for pushing out the cam member toward said hinge member means.

6. The device casing structure according to claim 5, wherein said hinge member means has a flange projecting in a lateral direction of said hinge member means, said cam member being brought into contact with said flange, thereby to stop the rotation of said first casing means.

7. The device casing structure according to claim 4, wherein said inclination retaining mechanism means includes a pair of ratchets which are mutually engageable and disengageable, and one of the ratchets is provided on said first casing means and the other of said ratchets is provided on said hinge member means.

8. The device casing structure according to claim 7, wherein one of said ratchets is slidably provided on said first support shaft and is pressed on the other ratchet by elastic means.

9. The device casing structure according to claim 8, wherein said other ratchet is formed as part of either one of said first casing means and said hinge member means.

10. A device casing structure, comprising:
first casing means for containing a display panel;
second casing means for containing a keyboard;
flexible connection member means for electrically connecting said display panel and said keyboard;
hinge member means for connecting said first casing means and said second casing means for rotation relative to one another, said hinge member means having a groove for insertion of said connection member means;
first coupling means for rotatably coupling said first casing means and said hinge member means; and
second coupling means for rotatably coupling said second casing means and said hinge member means;
rotation preventing means for preventing further relative rotation of the second casing means and said hinge member means when the second casing mans and said hinge member means are rotated relative to one another in an opening direction from a closed state to a predetermined angle; and
inclination retaining mechanism means for applying a load on said first casing means and said hinge member means which are rotatable relative to one another;
wherein, in a state in which said hinge member means is rotated relative to said second casing means through said predetermined angle and further rotation of said hinge member means in the opening direction is prevented by said rotation preventing means, said inclination retaining mechanism means applies said load to said first casing means to that said first casing means is held in an inclined position at said predetermined angle with respect to said second casing means; and
wherein said inclination retaining mechanism means includes a cam member slidably provided on said first casing means, and elastic means for pushing out said cam member toward said hinge member means.

11. A device casing structure, comprising:
first casing means for containing a display panel;
second casing means for containing a keyboard;
flexible connection member means for electrically connecting said display panel and said keyboard;
hinge member means for connecting said first casing means and said second casing means for rotation relative to one another, said hinge member means having a groove for insertion of said connection member means;
first coupling means for rotatably coupling said first casing means and said hinge member means; and
second coupling means for rotatably coupling said second casing means and said hinge member means;
rotation preventing means for preventing further relative rotation of the second casing means and said hinge member means when the second casing means and said hinge member means are rotated relative to one another in an opening direction from a closed state to a predetermined angle; and
inclination retaining mechanism means for applying a load on said first casing means and said hinge member means which are rotatable relative to one another;
wherein, in a state in which said hinge member means is rotated relative to said second casing means through predetermined angle and further rotation of said hinge member means in the opening direction is prevented by said rotation preventing means, said inclination retaining mechanism means applies said load to said first casing means so that said first casing means is held in an inclined position at said predetermined angle with respect to said second casing means; and
wherein said inclination retaining mechanism means includes a pair of ratchets which are mutually engageable and disengageable, and one of said ratchets is provided on said first casing means, and the other of said ratchets is provided on said hinge member means.

* * * * *